United States Patent [19]
Fanuele et al.

[11] 4,389,647
[45] Jun. 21, 1983

[54] DOPPLER DISCRIMINATION OF AIRCRAFT TARGETS

[75] Inventors: Michael A. Fanuele, Toms River; Joseph A. McCray, Freehold; Otto F. Rittenbach, Neptune, all of N.J.

[73] Assignee: The United States of America as represented by the Secretary of the Army, Washington, D.C.

[21] Appl. No.: 219,455

[22] Filed: Dec. 22, 1980

[51] Int. Cl.³ .................... G01S 13/52; G01S 13/00
[52] U.S. Cl. ........................ 343/7.7; 343/5 HE; 343/5 SA
[58] Field of Search ............... 343/5 HE, 5 SA, 7.7

[56] References Cited
U.S. PATENT DOCUMENTS

| | | | |
|---|---|---|---|
| 3,733,603 | 5/1973 | Johnston | 343/5 SA |
| 4,038,656 | 7/1977 | Webb, Jr. et al. | 343/5 HE |
| 4,233,605 | 11/1980 | Coleman | 343/5 HE |
| 4,241,350 | 12/1980 | Uffelman | 343/5 SA |
| 4,275,396 | 6/1981 | Jacomini | 343/5 SA |

Primary Examiner—S. C. Buczinski
Attorney, Agent, or Firm—Robert P. Gibson; Jeremiah G. Murray; Edward Golberg

[57] ABSTRACT

Two discriminator circuits are used with Doppler radars to indicate the type of aircraft in the radar beam based on the modulating effect of the aircraft rotor or propeller on the Doppler return signal. The increase in the Doppler signal when a rotor or propeller becomes orthogonal to the incident radar beam causes a spike in the detected Doppler signal. The frequency of such spikes is an indication of the make and model aircraft being observed and the circuitry comprises means for sensing such frequency and operating one of a plurality of indicators if such frequency corresponds to that of a known rotor or propeller frequency of a particular make and model aircraft corresponding to that indicator.

2 Claims, 7 Drawing Figures

DOPPLER DISCRIMINATION OF AIRCRAFT TARGETS

BACKGROUND OF THE INVENTION

This invention relates to radar, and more particularly to Doppler radar, sometimes known as MTI, for moving target indicator. Radars of this type respond only to moving targets. Echoes or returns from stationary targets return to the radar set with an unchanged carrier frequency whereas moving targets will return a Doppler-shifted carrier. The Doppler shift is positive or negative depending on whether the target is moving radially toward or away from the radar set. Radars of this type have been used to detect and measure the speed of moving aircraft for many years. These aircraft Doppler radars have usually relied on skin tracking of their targets for obtaining the desired information. Skin tracking occurs when the radar utilizes echoes reflected by the metal skin of the aircraft. Friendly aircraft are often equipped with transponders which enhance the echo by generating a return signal in response to the incident radar wave. None of these prior art Doppler radars are capable of discriminating between different types of aircraft under observation in the way that the present invention does.

The present invention comprises circuitry which can be connected to or made integral with Doppler radars intended for use against aircraft, and which can discriminate between different types of helicopters and between helicopters and fixed wing aircraft by means of the changes of target echoes of these targets.

The circuitry responds to the periodic changes in the radar reflectivity or cross-section of the helicopter rotors and the airplane propellers as they rotate. The resultant modulation of the target echoes will have a frequency which is characteristic of the type of aircraft under observation, and the circuitry is designed to respond to these different characteristics and thus discriminate between the different aircraft on this basis.

SUMMARY OF THE INVENTION

Two aircraft discriminators are shown as illustrative embodiments of the invention. The first discriminator is shown connected to a Doppler radar of the single channel type. The Doppler signal of this radar is first detected and the detected signal applied in parallel to a plurality of bandpass filters (BPFs). These BPFs are narrowly tuned to the fundamental frequency of the rotor or propeller blade modulation frequency of the different aircraft to be discriminated. The outputs of the BPFs are applied to threshold circuits via optional integrating circuits. Indicators which may be lamps or audible alarms are connected to each of the threshold circuits.

The second discriminator accomplishes a similar result with somewhat different circuitry. This discriminator is shown for illustrative purposes connected to a pulse type Doppler radar with dual or quadrature Doppler channels. These Doppler channels are detected and combined in an adder in such a way as to convert the aircraft fuselage return to a dc voltage, leaving the spikes and other modulation due to rotor and propeller modulation intact. The spikes are applied to a bandpass filter having a wide passband, e.g. 100–2000 Hz for L-band radar. This filter thus has a passband above the fundamental frequencies of most of the rotor and propeller modulation of interest, however it passes most of the harmonics thereof where a substantial percentage of the energy exists. Such a filter blocks the dc component. The output of the single BPF is applied to a threshold circuit and thence to an optional pulse stretcher. The pulse stretcher output is applied to a microprocessor which is programmed to sense the pulse rates and operates a plurality of indicators connected thereto if the pulse rates fall within predetermined limits representing different types of aircraft targets.

It is thus an object of this invention to provide circuitry capable of distinguishing between different types of helicopters which are observed by a Doppler radar set.

Another object of this invention is to provide circuitry capable of responding to the frequency of modulation of the radar cross-section of aircraft caused by the rotation of the rotors and propellers thereof, and to provide radar operators with information as to the type of helicopters or fixed wing aircraft based on the frequency of such modulation.

A further object of the invention is to provide discriminator circuitry which may be integrated into a Doppler radar set or connected thereto to provide information as to the type of aircraft being observed based on the effect of propeller and rotor blade modulation on the Doppler return from different aircraft.

These and other objects and advantages of the invention will become apparent from the following detailed description and the drawings.

DETAILED DESCRIPTION OF A PREFERRED EMBODIMENT

The Doppler radar target signature of a helicopter is composed of skin or fuselage return components which depend on the range and radar reflectivity of the helicopter for its amplitude and on the radial velocity of the craft along the radar beam for its frequency. Part of this skin return is a unique signature caused by rotor blade rotation. As the longitudinal blade axes become orthogonal to the direction of propagation of the incident radar beam, the radar cross section reaches an instantaneous maximum, causing a large momentary increase in the reflected signal and hence in the detected Doppler signal amplitude. As a first approximation, this increased radar cross section might be estimated to be equal to the echoing area of a long, thin antenna equal to the length of the rotor blades. This is not precisely the case since rotor blade flexing does not enable all of the reflected energy to add in phase, however this imprecise assumption can be used to get a first order approximation of the target signature of such a rotating blade.

It can be assumed that the incident radar beam has a plane wavefront by the time it reaches the rotor blades, thus the rotors re-radiate as a uniformly illuminated antenna which is rotating. If "$l$" is the blade length orthogonal to the incoming wave and $\lambda$ the transmitted wavelength, then:

$$\beta = \lambda/2l \qquad \text{Eq (1)}$$

where $\beta$ is the width of the reflected beam when the blade is orthogonal to the incident beam. Since the rotor is uniformly illuminated, the reflected pattern will be a sin x/x function. The 2 in the denominator of Eq (1) appears because the round trip phase shift is effective in forming the antenna pattern. This effectively doubles the aperture length.

Helicopter rotors rotate at constant speed, power changes being effected by blade pitch changes, thus if the constant rate of rotation is "n" time per second, the angular speed $\omega$ is given by:

$$\omega = 2\pi n \qquad \text{Eq (2)}$$

The time response, $\tau$, is obtained by dividing Eq (1) by Eq (2):

$$\tau = \beta/\omega = \lambda/4\pi n l \qquad \text{Eq (3)}$$

Figure 1:
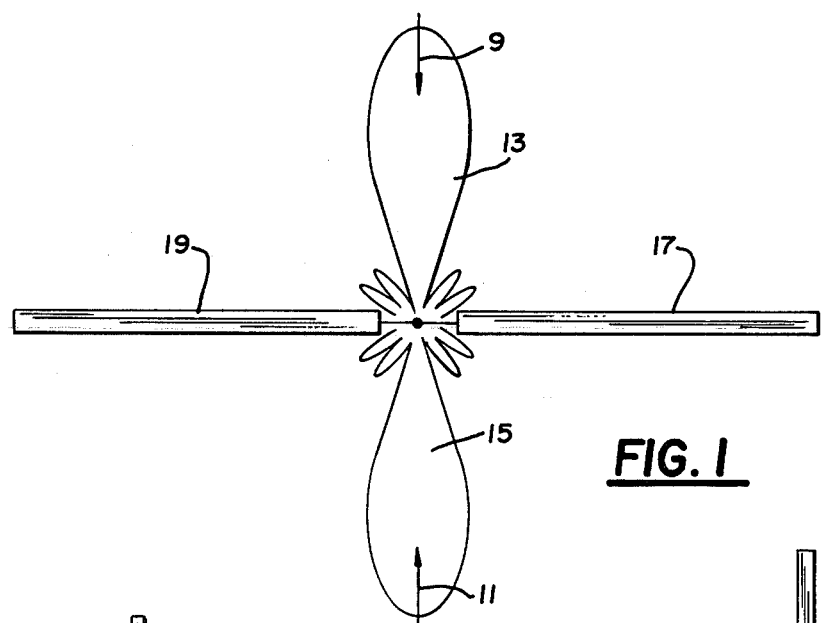
FIG. 1 shows a plan view of a two bladed helicopter rotor with two incident radar beams orthogonal thereto.

This time response will have a pulse width of $\tau$ and a pulse repetition rate given by the number of surfaces per second that are orthogonal to the incident radar beam. The two bladed rotor of FIG. 1 is that of a UH-1 type helicopter, which rotates at n=5 revolutions per second. The arrows 9 and 11 represent incident radar beams which are orthogonal to the instantaneous position of the rotor blades. Such a two bladed rotor will become orthogonal to a single incident beam such as 9 or 11 twice during each revolution thereof and thus momentarily increase the target echo due to the momentary increase in radar cross section. The resulting increased target echo causes a sharp increase in the detected Doppler signal amplitude, as explained above. The frequency of these detected spikes can be used to identify the type of aircraft being observed by means of circuitry such as that of FIGS. 6 and 7.

In FIG. 1, the radiation patterns 13 and 15 are those of the reflected energy, assuming as stated above that the rotor acts as a straight, thin, uniformly illuminated radiator. The UH-1 type helicopter has two blades as shown in FIG. 1 and it rotates at 5 Hz. Thus a Doppler radar set observing this aircraft would see the radar cross section thereof being modulated at the rate of 10 Hz.

Figure 2:
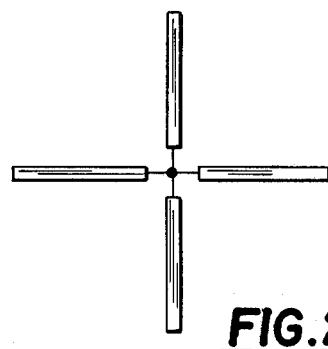
FIG. 2 shows a plan view of a four bladed helicopter rotor.

FIG. 2 shows a four bladed helicopter rotor. The OH-6A helicopter has such rotors and the speed thereof is 7.5 Hz. It is obvious that one of these blades would become orthogonal to an incoming radar beam every 90° of rotor rotation and thus this type of helicopter will modulate the echo signals at a rate of 30 Hz.

Figure 3:
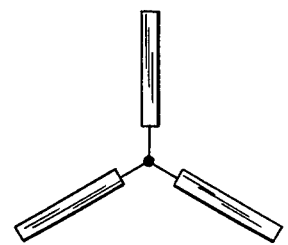
FIG. 3 a similar view of a double rotor, three bladed helicopter.

FIG. 3 shows a pair of three bladed rotors such as those of the CH-47 helicopter. These rotors are phased with each other so that the relative speed and phase thereof always remain constant. The speed of these rotors is 4 Hz, thus the six blades will yield a spike frequency of 24 Hz in the detected Doppler signal.

Figure 4:
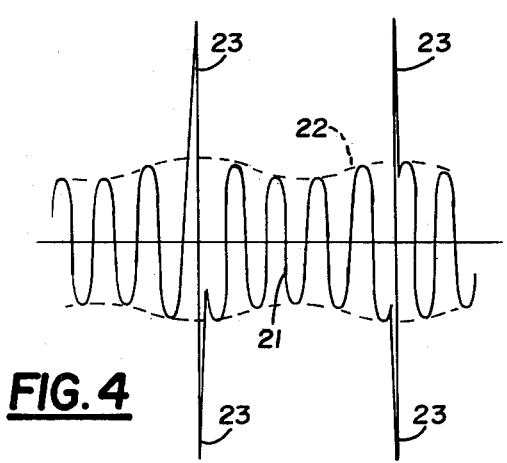
FIGS. 4 and 5 show temporal and spectral waveforms of the echo signals reflected from aircraft rotors and propellers.
Figure 5:
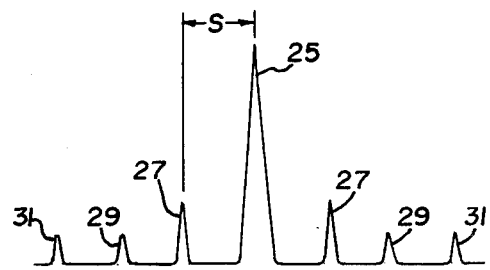

The waveform of FIG. 4 represents the detected Doppler signal resulting from a non-hovering helicopter. The wave is seen to consist of a lower amplitude, generally sinusoidal portion 21 which is mainly due to the fuselage return of the helicopter. The amplitude thereof is determined mainly by the radar cross section of the helicopter fuselage and the frequency by the helicopter's radial velocity along the beam. The spikes 23 occur each time a rotor blade is orthogonal to the incident beam, as explained above, and represent a sharp momentary increase in the Doppler signal amplitude. The Doppler signal 21 is amplitude modulated at a low frequency as indicated by the envelope 22. This envelope has a component at the spike frequency due to the rotor modulation of the Doppler signal. FIG. 5 shows the signal of FIG. 4 in the frequency domain. The large central peak 25 is at the basic Doppler skin frequency, with the sidebands 27, 29 and 31 spaced therefrom by the spike frequency, s.

Similar modulation effects are produced by fixed wing, propeller driven aircraft. Such an aircraft, with two bladed propellers, for example the C-45, would produce a modulation frequency of twice the propeller rotation frequency. The radar cross section of such aircraft will be modulated at a rate related to its propeller rpm, each time that a propeller blade becomes orthogonal to the incident radar beam. The aforementioned C-45 propellers rotate at about 35 Hz, thus the modulation or spike frequency thereof would be twice this figure, or 4 times, depending on whether or not the two propellers are phased with each other.

Thus most helicopters have spike frequencies lower than those of propeller driven aircraft. Thus circuitry can be devised to distinguish helicopters from fixed wing aircraft and also to distinguish between different types of helicopters.

Figure 6:
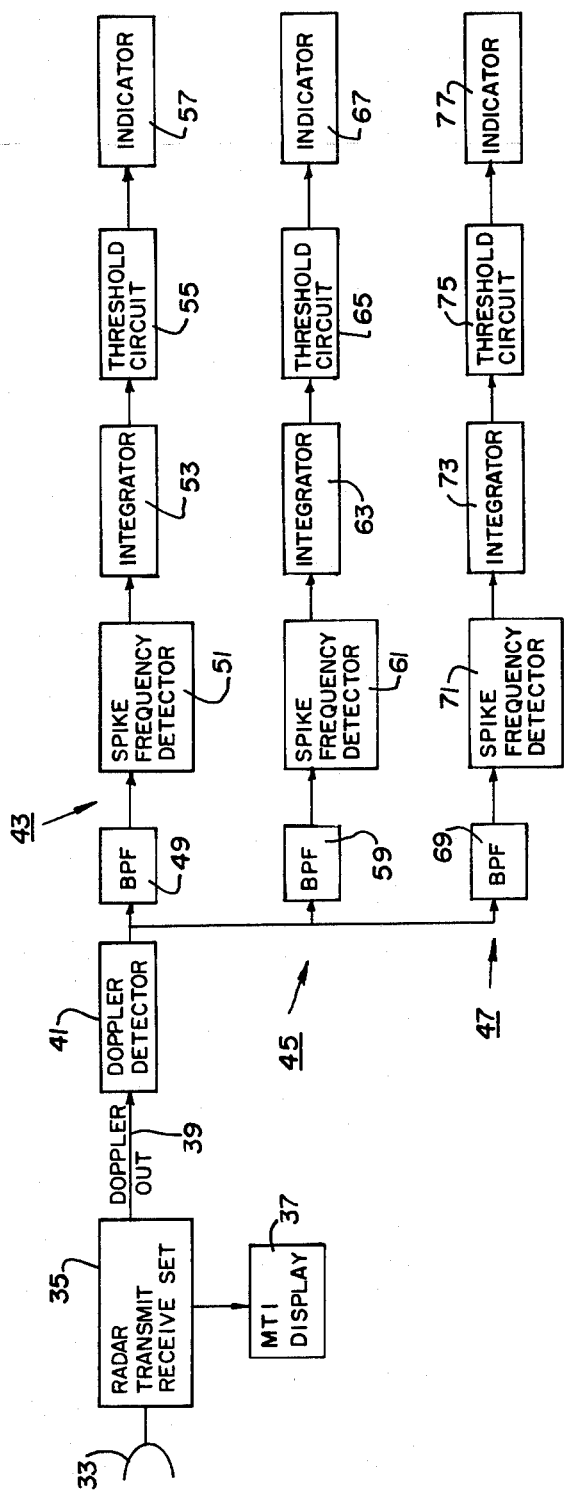
FIGS. 6 and 7 are two discriminator circuits designed according to the teachings of the present invention.

The discriminator of FIG. 6 includes a Doppler radar set 35 including antenna 33 and moving target indicator display 37, all of which are conventional. The radar may be pulsed or continuous wave and includes a Doppler signal output 39, which is applied to Doppler detector 41. Detector 41 can be merely a simple diode circuit which rectifies the Doppler signal. Thus most of the Doppler signal representing the fuselage or skin return of aircraft target echoes will be converted to dc and will not be passed by the subsequent circuitry, but acts as a reference for returns due to rotor and propeller modulation. The subsequent circuitry comprises a plurality of channels, each designed to respond to a particular spike frequency characteristic of a particular helicopter or fixed wing aircraft. Three channels are shown, 43, 45 and 47. Channel 43 comprises, in cascade, bandpass filter 49, spike frequency detector 51, integrator 53, threshold circuit 55 and indicator 57. The other channels 45 and 47 contain identical circuit elements, but the bandpass filter of each channel has a different center frequency. Each filter is tuned to the fundamental spike frequency of the rotor or propeller modulation to be detected by that channel. For example, if channel 43 were intended to detect UH-1 helicopters, the filter 49 would have a narrow passband of approximately 1 Hz centered on 10 Hz. The three channels thus may be tuned to detect three different types of helicopters, for example, the three discussed above, or two of the channels may be tuned to helicopter spike frequencies and the third to a fixed wing propeller frequency. The filters 49, 59, and 69 will convert the detected Doppler signals at their inputs to ac at the center frequency of the filters. It should be noted that the detected Doppler signal will comprise the detected spike 23 of FIG. 4 plus the modulation 22 of the Doppler signal. The output of the filters will be essentially sine waves at the incoming spike frequency. The spike frequency detector 51 rectifies this ac wave and applies the resultant dc to an integrator 53 which may comprise merely a low pass filter with a time constant chosen to enable it to build up its voltage from numerous successive spikes, thus increasing the sensitivity of the circuit. When the output of integrator 53 reaches the threshold of threshold circuit 55, it will apply a signal to indicator 57. The indicator may be a lamp or aural alarm for advising personnel of the presence of a target corresponding to that channel. If the added sensitivity of the integration process is not desired or needed, the circuit can be simplified by omitting the spike frequency detector and integrator.

The other channels 45 and 47 of FIG. 6 operate in the same manner as channel 43.

The circuit of FIG. 6 relies on the narrow tuning of the filters to the known modulation frequencies to exclude extraneous clutter signals, however under certain conditions if the aircraft being detected are flying against a background of terrain which is also being picked up by the radar and there happen to be slow moving vehicles on the terrain, false alarms could occur. The radar 81 of FIG. 7 is designed to eliminate or reduce such false alarms by providing a wideband bandpass filter with the lower edge of its passband above most of the Doppler returns from the aforementioned surface vehicles.

Figure 7:
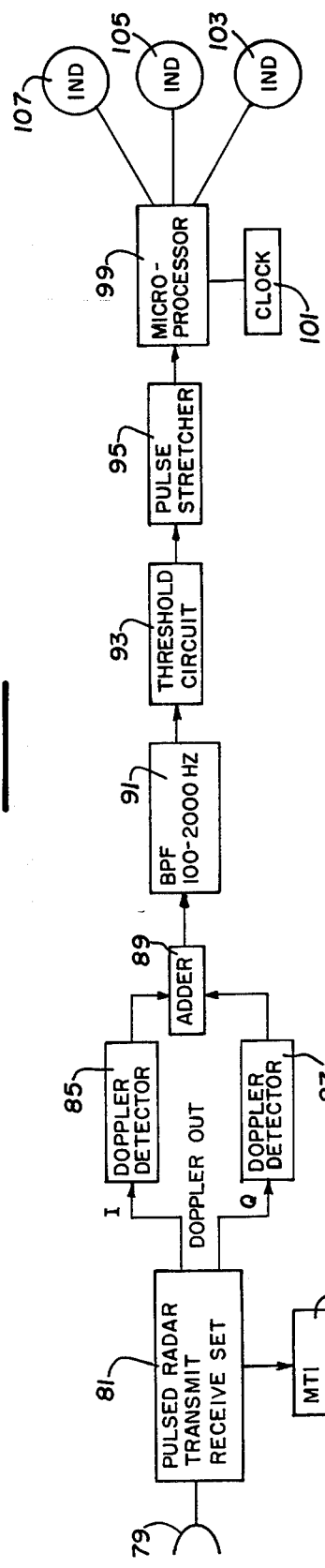

The circuit of FIG. 7 includes a pulsed Doppler radar 81 with antenna 79 and MTI display 83. The two Doppler channels therein produce two quadrature Doppler outputs, I and Q. The I and Q channels are applied to detectors 85 and 87 and the detected outputs are added in adder 89. If the detectors 85 and 87 are square law detectors, the sine and cosine I and Q signals will be squared therein to yield sine and cosine squared detected signals. Since the sum of such squared functions is a constant equal to unity, the output of adder 89 will be constant or dc for all Doppler signals of steady or constant amplitude. The spikes caused by rotor and propeller modulation will cause increases in the dc output which will amount to a dc train of spikes at the same frequency. It should be noted that if simple diodes are used as detectors rather than the square law devices mentioned, a small ripple at twice the target's skin Doppler frequency would appear at the output of adder 89. This would not greatly affect the operation of the circuit.

The dc spike train from the adder is applied to the wideband bandpass filter 91 which is shown with a passband extending from 100 to 2000 Hz. The narrow spikes characteristic of rotor and propeller modulation from the aircraft discussed above will have substantial amounts of energy in this passband. The output of filter 91 is applied to threshold circuit 93 which produces a short pulse each time its input voltage rises above a set threshold. Pulse stretcher 95 stretches the pulses from the threshold circuit. The spikes in question sometimes come in closely spaced pairs which are really the result of a reflection from a bent rotor or propeller. The pulse stretcher prevents such pulses from being erroneously counted as two pulses. The clock 101 is connected to an input of microprocessor 99, which has another input adapted to receive the stretched pulses from 95. A plurality of indicators similar to those of FIG. 6 are connected to microprocessor 99. The microprocessor is arranged to count the stretched pulses from a predetermined period, for example one second is determined by clock 101, and operate one of the indicators 103, 105 or 107 if the counted pulses correspond to the spike frequency, plus or minus 1 Hz, of an aircraft represented by that indicator. After each counting period, the internal counter of the microprocessor is reset to begin another cycle. To reduce incorrect indications, the circuit can be arranged so that the indicators are not operated unless the same or the approximate count is obtained at least for m out of n time slots, for example, for any 2 out of 3 successive time slots.

While the invention has been described in connection with illustrative embodiments, variations therein will occur to those skilled in the art without departing from the teaching of the present invention. Accordingly, the invention should be limited only by the scope of the appended claims.

We claim:

1. A Doppler radar capable of discriminating between different types of aircraft having rotating elements including circuitry for sensing the occurrence of increases in the Doppler signal amplitude of target returns resulting from increases in cross section of the rotating elements as they become orthogonal to the incident radar beam of said radar, said circuitry comprising, Doppler detector means for detecting the Doppler signal of said radar including a direct reference voltage indicative of the body of said aircraft and a spike frequency component indicative of the orthogonal rotating element of a particular aircraft type, bandpass filter means coupled to the Doppler detector, said bandpass filter means having a wide passband that blocks the direct voltage and passes the spike frequency component, a threshold circuit and a pulse stretcher connected in cascade to the output of said bandpass filter, said threshold circuit providing an output pulse upon the occurrence of said spike frequency above a set threshold, a microprocessor adapted to receive the output of said pulse stretcher, a clock connected to said microprocessor, and a plurality of indicators connected to the output of said microprocessor, each indicator being associated with a respective aircraft type, said microprocessor being adapted to count the number of stretched pulses occurring in a predetermined time period determined by the frequency of said clock and to operate an indicator if the frequency of said stretched pulses corresponds closely to the rotating element spike frequency of an aircraft represented by that indicator.

2. The Doppler radar of claim 1 wherein said Doppler signal comprises quadrature I and Q channels and wherein said detector means comprises a pair of square law detectors having their inputs connected to respective said I and Q channels and an adder connected to the outputs of said channels, the output of said adder being the detected Doppler signal.

* * * * *